United States Patent

[11] 3,548,950

[72] Inventors Cyril A. Phelan;
   Edwin M. Taylor, Arroyo Grande; Keith A. Rapp, Oceano, Calif.
[21] Appl. No. 662,077
[22] Filed Aug. 21, 1967
[45] Patented Dec. 22, 1970
[73] Assignee Phelan & Taylor Produce Co.,
   Oceano, Calif., a corporation of California

[54] APPARATUS FOR HARVESTING CELERY AND THE LIKE
   6 Claims, 14 Drawing Figs.
[52] U.S. Cl. .................................................. 171/39,
   171/62; 56/327; 171/56
[51] Int. Cl. ........................................................ A01d 27/04
[50] Field of Search ............................................ 171/29, 39,
   62, 56, 58; 56/327

[56] References Cited
UNITED STATES PATENTS
| | | | |
|---|---|---|---|
| 1,146,575 | 7/1915 | Johnson ........................ | 171/39 |
| 1,148,492 | 8/1915 | Anthenill ...................... | 171/39 |
| 1,179,767 | 4/1916 | Siesfus .......................... | 171/39 |
| 2,585,416 | 2/1952 | Weid et al ..................... | 171/29 |

Primary Examiner—Antonio F. Guida
Attorney—Paul A. Weilein

ABSTRACT: An agricultural machine for harvesting and loading on an adjacent transport vehicle row crops, such as celery, which are characterized by exposed, edible stalks, the machine having a harvesting vehicle which travels along the crop rows and means on the harvesting vehicle for severing the exposed stalks in the rows at ground level and continuously conveying the severed stalks to the transport vehicle.

INVENTORS.
CYRIL A. PHELAN
EDWIN M. TAYLOR
BY KEITH A. RAPP

Paul A. Weilein
ATTORNEY

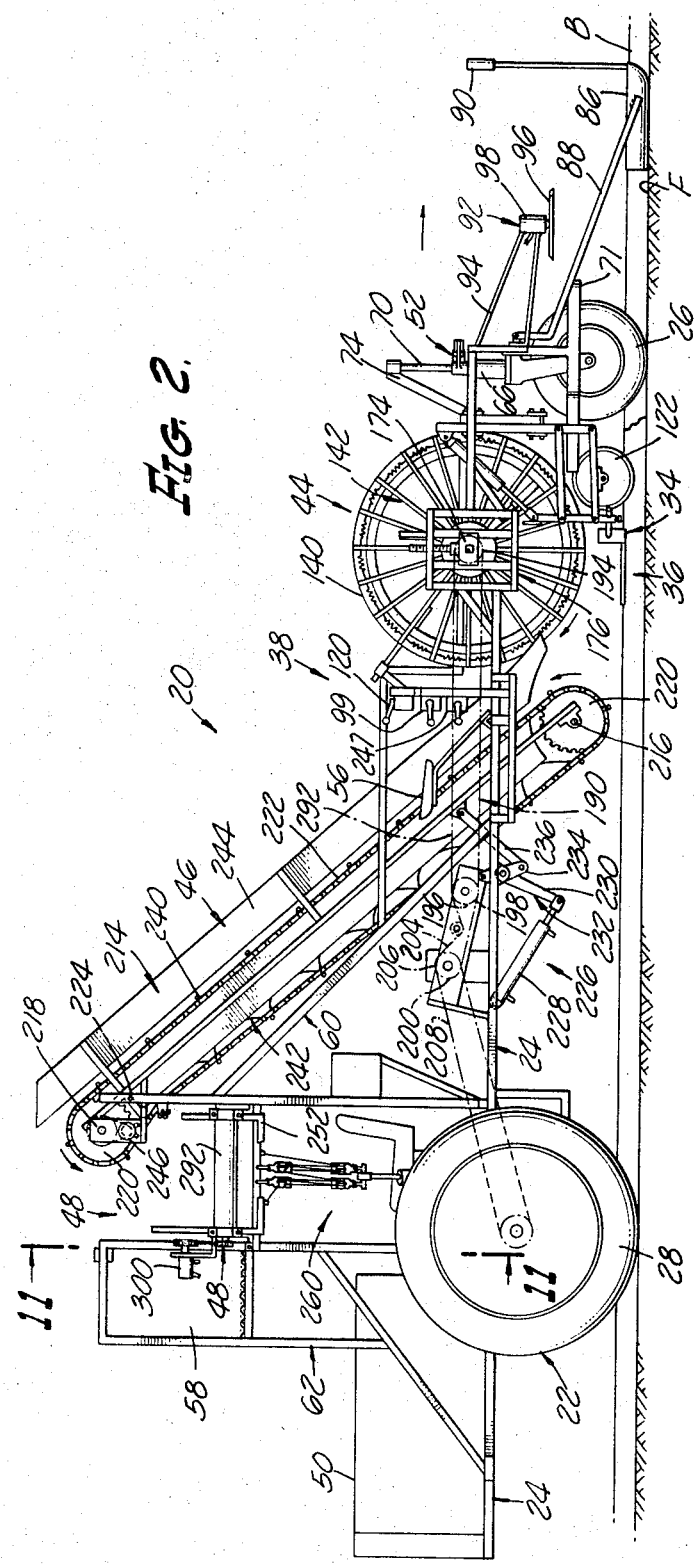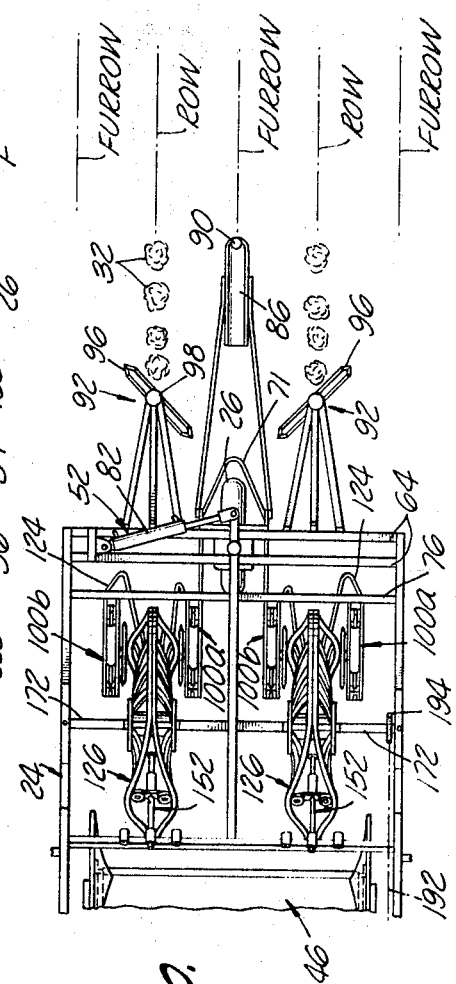

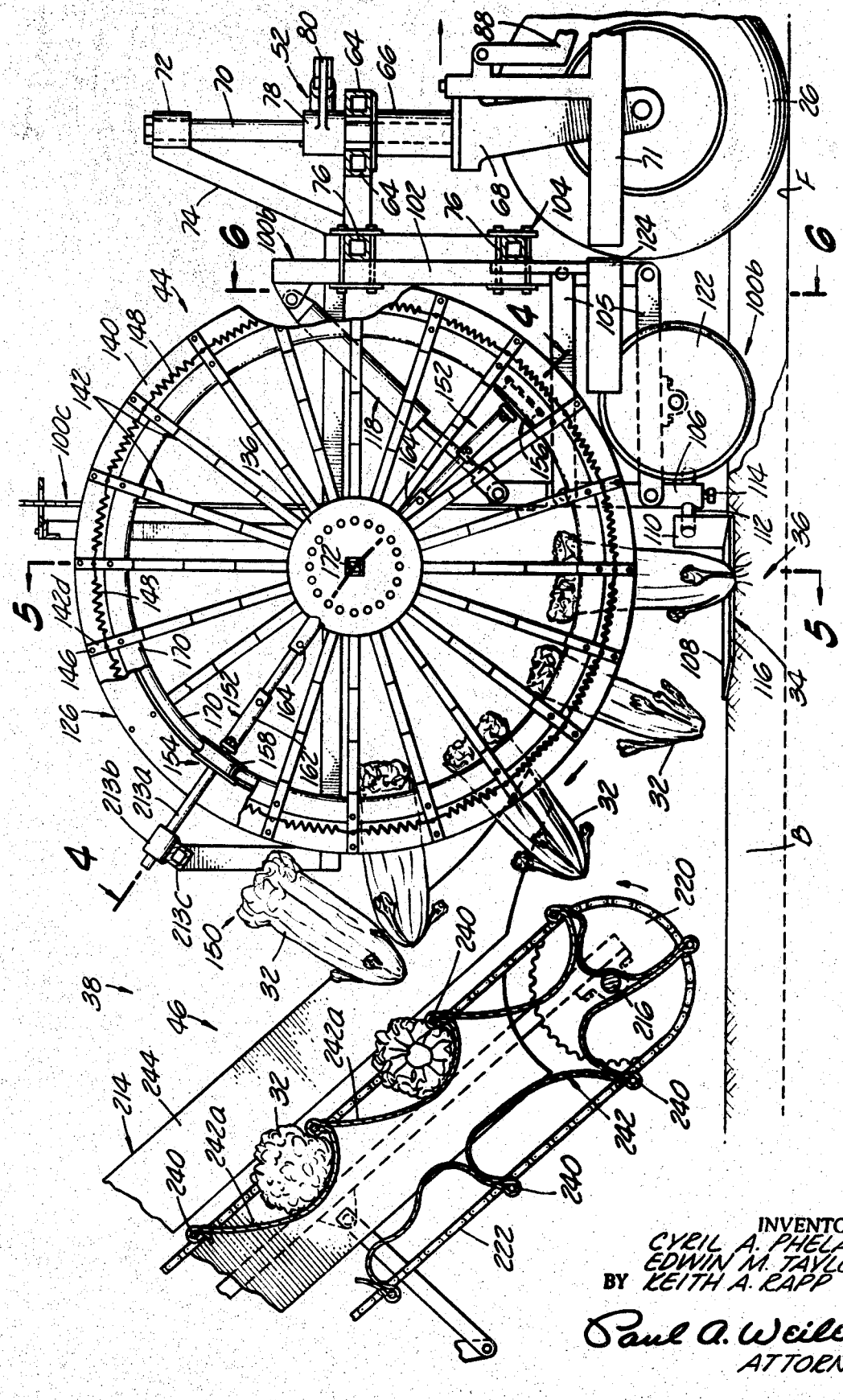

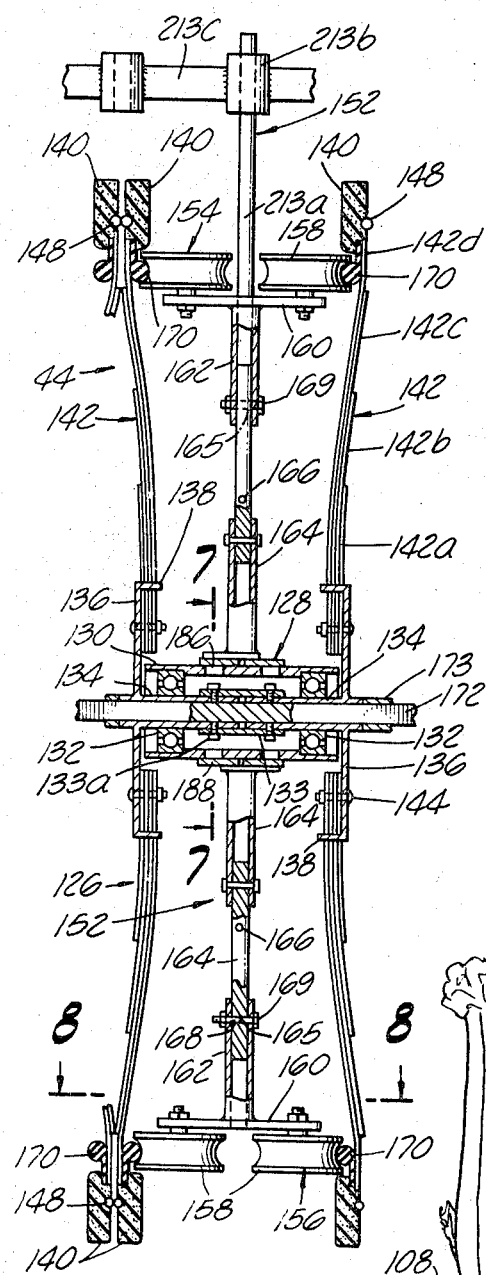

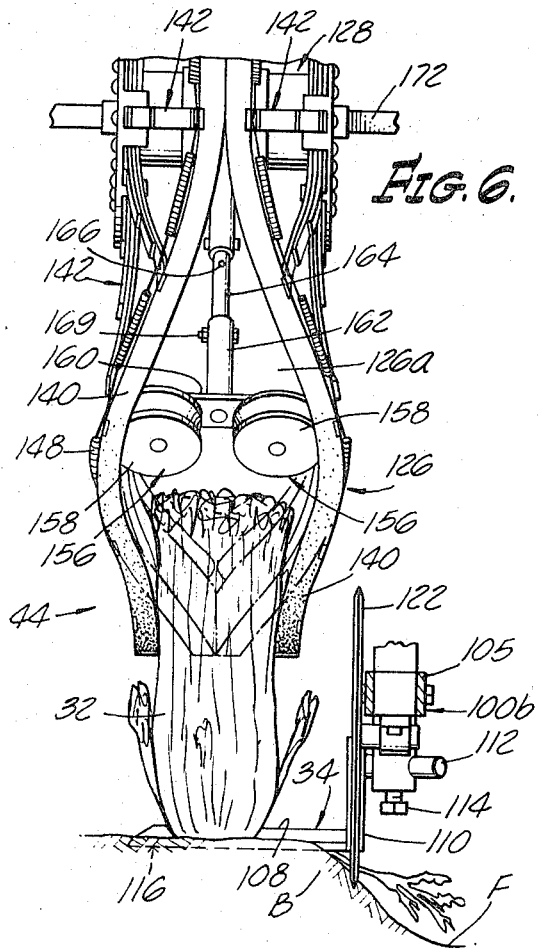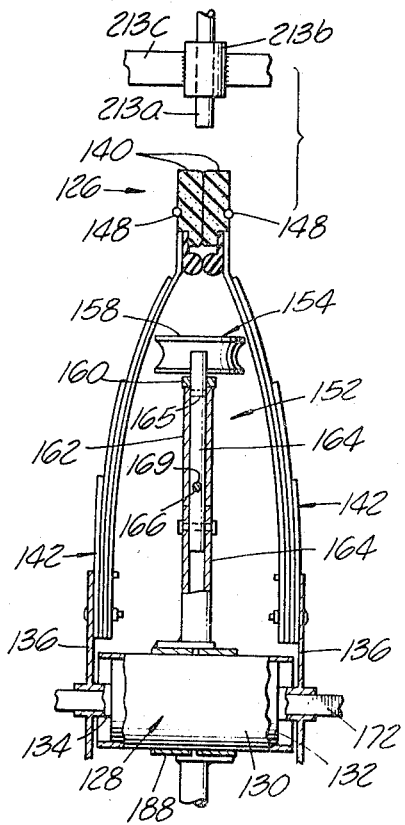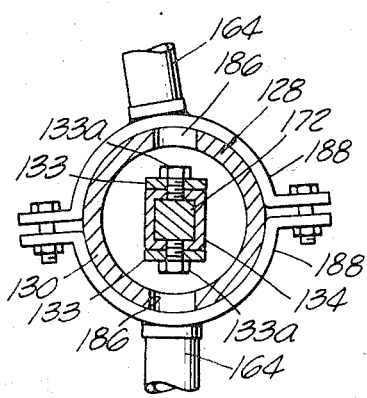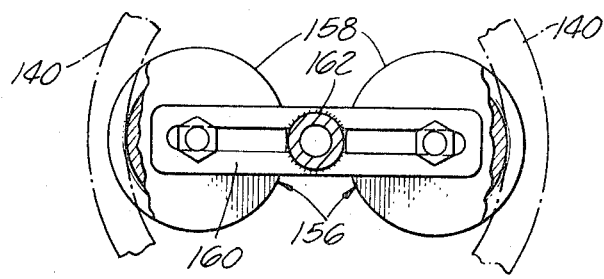

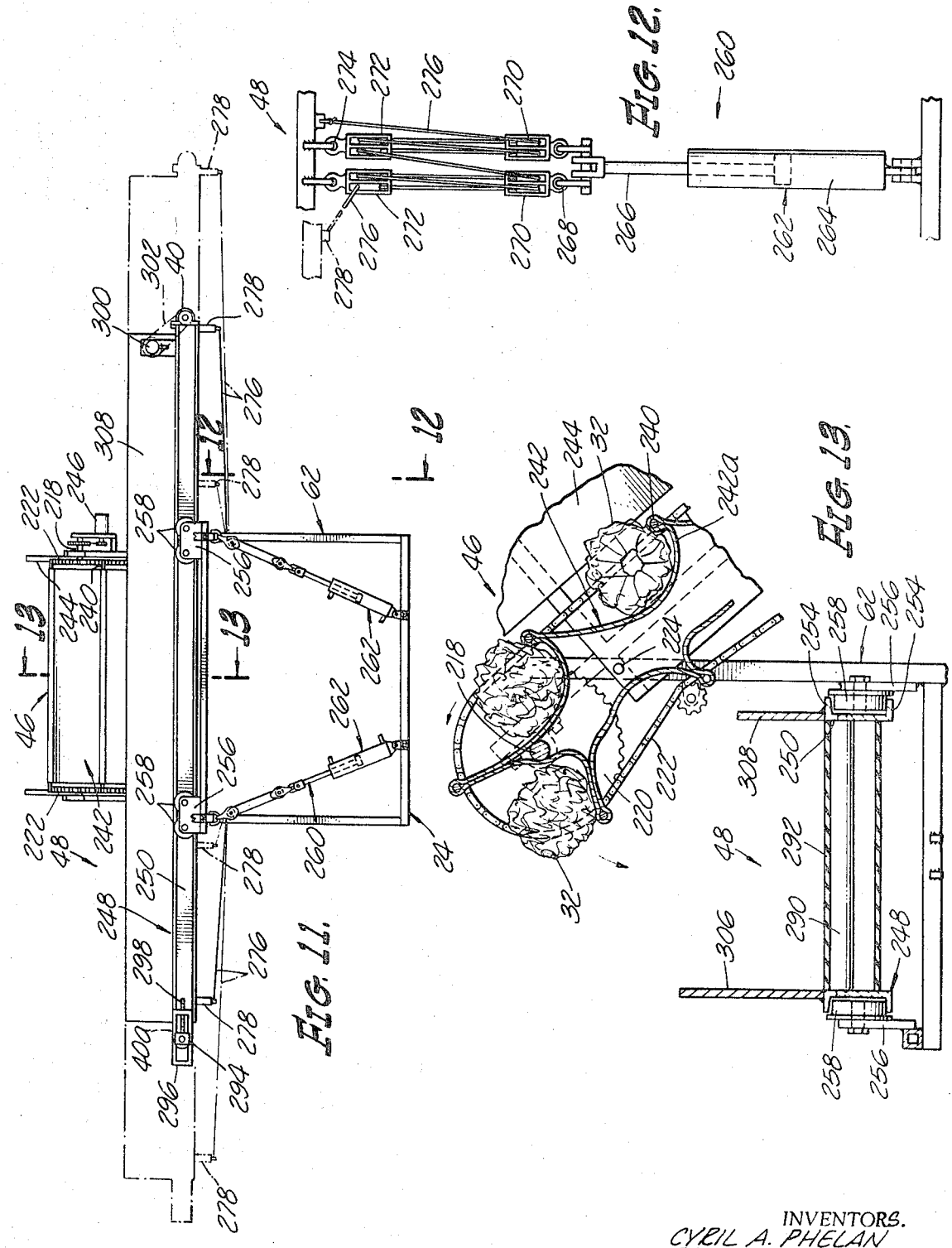

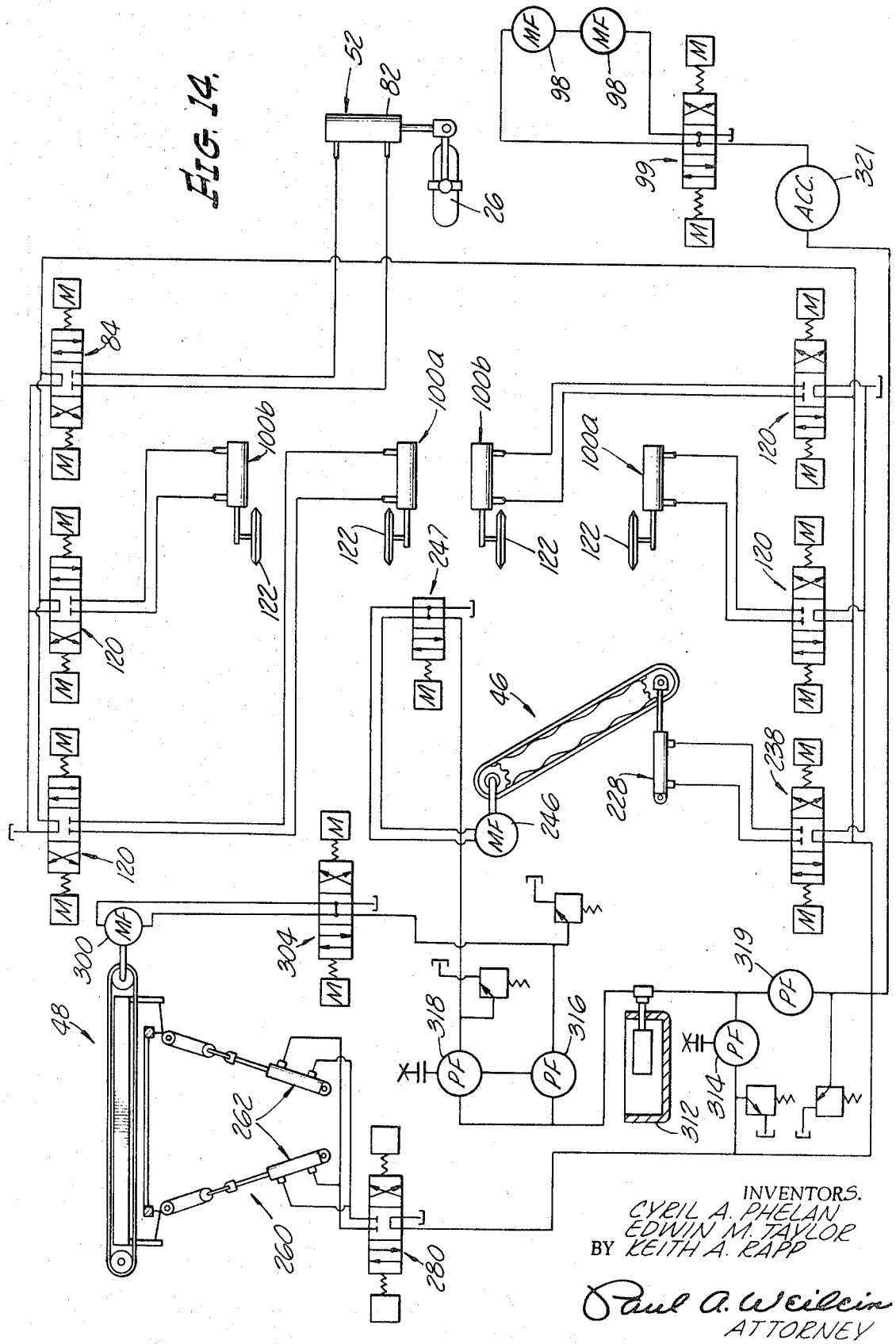

3,548,950

1

APPARATUS FOR HARVESTING CELERY AND THE LIKE

BACKGROUND OF THE INVENTION

This invention relates generally to agricultural machines. More particularly, the invention relates to a combined harvesting and loading machine for harvesting and loading on an adjacent transport vehicle row crops, such as celery, characterized by exposed, edible stalks.

Celery is commonly grown in generally parallel crop rows from seeds or sprouts which are planted along the crests of raised seed beds separated by intervening irrigation furrows. In some cases, the seed beds are planted in such a way as to produce a single row of celery along each bed. In other cases, the beds are planted to produce two parallel rows of celery along each bed.

After the celery has grown to maturity, it is harvested by severing the exposed celery stalks near the ground and loading the severed stalks onto a transport vehicle which transports the harvested celery from the field for subsequent packaging and distribution. In recent years, celery harvesting has been aided by the development of celery harvesting machines. Some of these harvesting machines are more accurately described as celery loading machines. Such a celery loading machine is, in essence, merely a mobile conveyor which is designed to follow celery pickers who slice and pick the exposed celery stalks by hand and place the severed stalks on a loading machine. The loading machine then conveys the severed stalks to a transport vehicle which travels across the field with the harvesting machine. Other celery harvesting machines are true harvesting machines in that they automatically sever and gather the exposed celery stalks as they travel along the celery rows. Some harvesting machines of this king, for example, have blades for severing the celery stalks in a number of adjacent celery rows and means to grip the severed celery stalks and convey the same to a receiving means.

One problem to which the invention is directed is to provide an improved harvesting machine of the character described which is operative to automatically sever the exposed stalks to be harvested, gather the severed stalks as they are cut, and convey the severed stalks to the transport vehicle in such a way as to generally uniformly distribute the stalks over the loading area of the transport vehicle.

Another problem is to provide an improved rotary stalk gathering or gripping wheel construction for the harvesting machine for gripping the severed stalks as they are cut and transporting the severed stalks to the transfer conveyor of the machine.

A further problem is to provide a novel transfer conveyor construction and a novel loading conveyor construction for the harvesting machine.

A still further problem is to provide a harvesting machine that is adjustable to accommodate harvesting of celery which is grown in either single or double rows.

All of the above problems are met by the present invention.

SUMMARY OF THE INVENTION

The present harvesting machine is characterized by a vehicle which travels along the rows of celery to be harvested, severing means for severing the exposed celery stalks at ground level, gathering means for gathering the severed stalks as they are cut, an elevated loading conveyor for conveying the severed stalks from the harvesting machine to an adjacent transport vehicle which travels with the harvesting machine along the celery rows, and a transfer conveyor for conveying the severed stalks from the gathering means to the loading conveyor. Other aspects of the invention are concerned with various improved components of the overall harvesting machine, including a novel rotary, severed stalk gathering or gripping wheel construction for use as the gathering means of the harvesting machine, and novel transfer and loading conveyor constructions for the machine.

2

BRIEF DESCRIPTION OF THE DRAWINGS

FIG. 2 is a side elevation of the celery harvesting machine;

FIG. 3 is an enlarged section taken on line 3-3 in FIG. 1 illustrating, in particular, one of the improved severed stalk gathering or gripping wheels and a portion of the improved transfer conveyor of the harvesting machine;

FIG. 4 is an enlarged section taken on line 4-4 in FIG. 3 illustrating certain spreading means which are embodied in the severed stalk gripping wheel for spreading resilient rim members of the wheel at two circumferentially spaced, stalk harvesting and transfer stations about the wheel;

FIG. 5 is an enlarged section taken on line 5-5 in FIG. 3 illustrating a celery stalk at the harvesting station of the machine as it is about to be severed and gripped by a stalk gripping wheel;

FIG. 6 is an enlarged section taken on line 6-6 in FIG. 3 illustrating the manner in which the resilient rims of a stalk gripping wheel are spread as they approach the harvesting station to receive therebetween a celery stalk to be harvested;

FIG. 7 is an enlarged section taken on line 7-7 in FIG. 4 through the hub of a stalk gripping wheel;

FIG. 8 is an enlarged section taken on line 8-8 in FIG. 4 illustrating rim spreading means of a stalk gripping wheel to normal operative position;

FIG. 9 is a section, similar to the upper portion of FIG. 4, illustrating the manner in which the spreading means for each stalk gripping wheel of the harvesting machine may be adjusted to inoperative positions;

FIG. 10 is a fragmentary plan view of the front end of the present harvesting machine illustrating the latter conditioned for harvesting celery which is grown in single rows;

FIG. 11 is an enlarged vertical section taken on line 11-11 in FIG. 2 through the loading conveyor of the harvesting machine;

FIG. 12 is an enlarged fragmentary view of the loading conveyor taken on line 12-12 in FIG. 11;

FIG. 13 is an enlarged fragmentary vertical section taken on line 13-13 of FIG. 11 through the transfer conveyor and loading conveyor of the harvesting machine; and FIG. 14 is a schematic circuit diagram of a hydraulic system embodied in the harvesting machine.

DESCRIPTION OF THE PREFERRED EMBODIMENT

General Arrangement

(FIGURES 1, 2, and 10)

Figure 1:
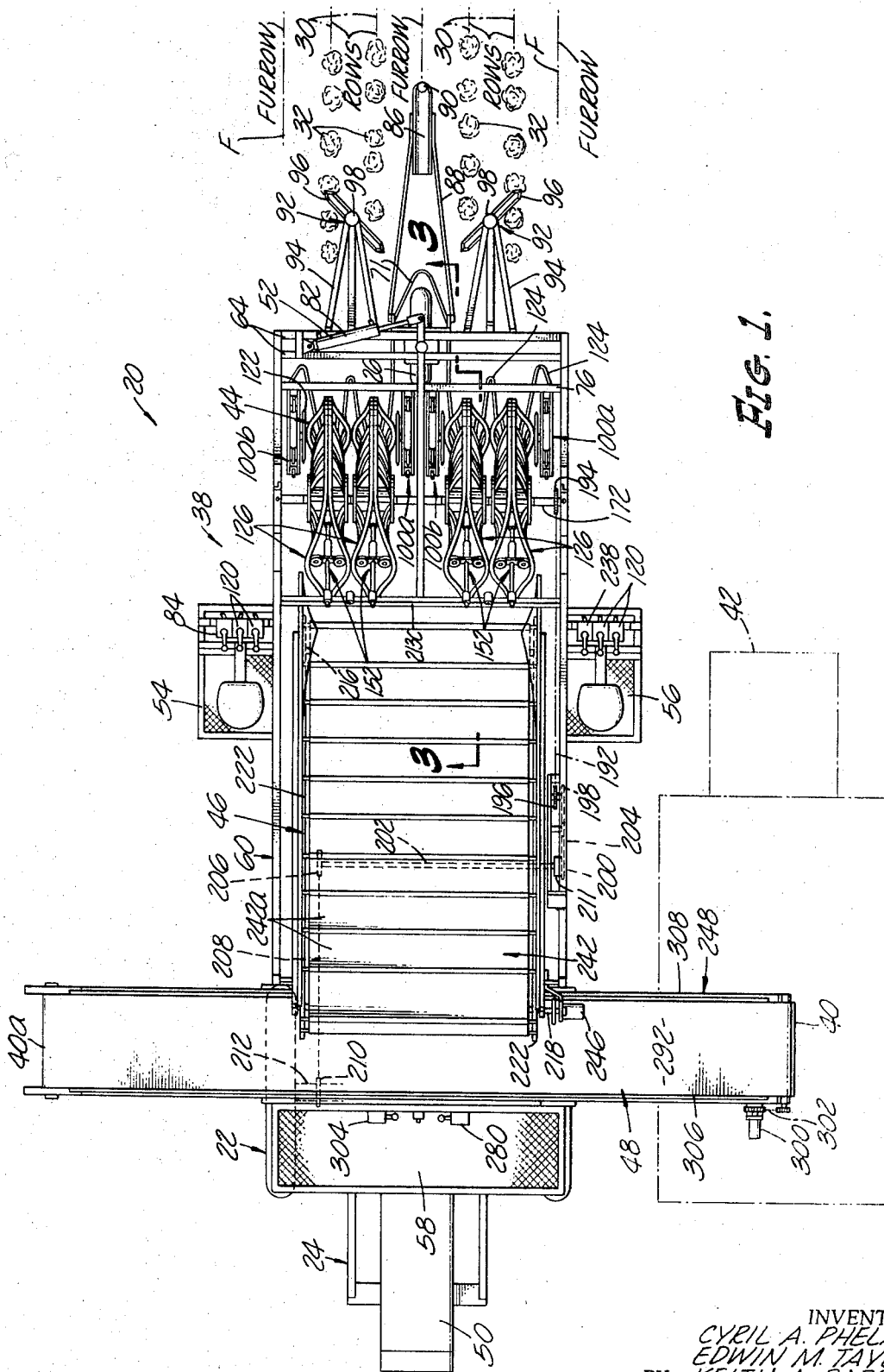
FIG. 1 is a top plan view of a celery harvesting machine according to the invention.

In the drawings, the celery harvesting machine 20, comprises, in general terms, a harvesting vehicle 22 having a frame 24 supported on front and rear wheels 26 and 28 for movement of the vehicle along the rows 30 containing the crops 32 to be harvested, in this instance celery. MOunted upon the harvesting vehicle 22 are crop severing means 34, located at a lower harvesting station 36 of the machine, for severing the exposed celery stalks approximately at ground level, and combined severed stalk gathering and conveying means 38 for gathering the severed celery stalks as they are cut at the harvesting station and transporting the severed stalks from the harvesting station to an elevated discharge station 40 which is located a substantial distance above ground level and from which the severed stalks are discharged from the harvesting machine to a transport vehicle 42 (FIG. 1) located below the latter station. This transport vehicle travels in unison with the harvesting machine along the rows of celery to be harvested and, when filled to capacity, transports the harvested celery from the field for subsequent packaging and distribution. The gathering-conveyor means 38 of the harvesting machine comprise severed stalk gathering or gripping means 44, a transfer conveyor 46, and a loading conveyor 48. The stalk gathering means 44 are effective to grip the severed celery stalks at the harvesting station 36 as the stalks are cut by the severing means 34 and to transport the severed stalks from the latter station to the transfer conveyor 46. The transfer conveyor transports the stalks from the gathering means 44 to the loading conveyor 48. The loading conveyor, in turn, transports the stalks to the discharge station 40 of the harvesting machine. As will appear from the ensuing description, a unique feature of the invention resides in the fact that the loading conveyor is movable or adjustable relative to the harvesting machine in such a way as to effect generally uniform loading of the harvested celery onto the transport vehicle 42. An additional feature of the illustrated harvesting machine is that it has a second alternate discharge station 40a located at the opposite end of the loading conveyor 48 and at the opposite side of the harvesting machine from the station 40, and the loading conveyor is reversible to convey the severed celery stalks to either station.

The desirability of having the loading conveyor 48 reversible may be understood when it is considered that when the harvesting machine is in operation one side of the machine is adjacent the unharvested crop and the opposite side of the harvesting machine is in the area that has already been harvested and, of course the accompanying transport vehicle 42 is also in the area that has already been harvested. If the harvesting machine traverses the length of a field and then turns around to traverse the field in the opposite direction, it is obvious that the accompanying transport vehicle would be transferred to the opposite side of the harvesting machine and that, accordingly, the loading conveyor would be reversed.

The particular celery harvesting machine 20 illustrated is self-propelled. To this end, the rear ground wheels 28 of the harvesting vehicle 22 are actuated by a propulsion engine 50, which is shown to be located at the rear end of the machine but may be at any other satisfactory location. The machine has a single front ground wheel 26 which is supported for steering movement relative to the machine frame 24 and is driven in this steering movement by steering means 52. The illustrated harvesting machine has three operator's stations 54, 56, and 58. As will be hereinafter explained, these operator's stations are equipped with controls to be actuated by operators at the respective stations for controlling the various operating mechanisms and functions of the machine.

Briefly, during operation of the present harvesting machine, the harvesting vehicle 22 travels along the rows 30 of celery 32 to be harvested. The transport vehicle 42 travels forwardly with and at the same speed as the harvesting machine in such a way that the transport vehicle remains in a generally stationary position relative to the harvesting machine, wherein the loading or cargo area of the transport vehicle is located below the discharge station 40 of the harvesting machine to receive the harvested celery from the machine. As the harvesting machine proceeds along the celery rows 30, the exposed celery stalks are severed at ground level by the severing means 34 and immediately gathered or gripped by the stalk gathering or gripping means 44. The severed stalks are continuously transported, by the gathering means 44, from the harvesting station 36 to the transfer conveyor 46. The transfer conveyor then transports or conveys the harvested celery upwardly from the gathering means to the elevated loading conveyor 48. This loading conveyor transports the harvested celery to the discharge station 40, from which the celery discharges or drops onto the transport vehicle 42.

Harvesting Vehicle 22

(FIGURES 1, 2)

Referring now in more detail to the celery harvesting machine 20 of the invention which has been selected for illustration in the drawings, the frame 24 of the harvesting vehicle 22 is shown to comprise a number of longitudinal, lateral, and upright frame members which are welded or otherwise rigidly joined to provide the frame with a main longitudinal frame portion 60 of generally open rectangular configuration and an upright supporting frame structure 62 rising from the longitudinal frame portion 60, adjacent the rear end thereof.

As noted earlier, and as is well known in the art, celery and the other crops which may be harvested with the aid of the present harvesting machine, are planted and grown along the crests of raised seed beds B separated by intervening irrigation ditches or furrows F. In some cases, each bed contains two rows 30 of celery, as illustrated in FIG. 1, and in other cases, a single row of celery, as illustrated in FIG. 10. As noted earlier, and hereinafter explained, a feature of the present harvesting machine resides in the fact that it may be adjusted or conditioned to harvest celery which is grown either in single or double rows. In accordance with customary practice in harvesting machines of this general type, the two rear wheels 28 of the harvesting vehicle 22 are spaced to straddle the seed beds B containing the rows of celery to be harvested and to ride in the furrows F located outboard of these rows. The rear wheels of the illustrated machine, for example, are disposed to straddle two seed beds. The single front wheel 26 of the harvesting machine is centered relative to the rear wheels and is thereby located to ride in the intervening furrow between the two seed beds straddled by the rear wheels. It will now be understood, therefore, that the celery harvesting machine 20 is adapted to travel along the rows 30 of celery to be harvested without causing damage to the celery.

At the forward end of the longitudinal frame portion 60 of the harvesting vehicle frame 24 are a pair of elevated, horizontal transverse frame members 64. Welded or otherwise rigidly joined to the undersides of these frame members, midway between their ends, is a bearing 66 having a vertical axis which passes midway between the frame members. The front steering wheel 26 of the harvesting vehicle is rotatably supported in a yoke 68 rigid on the lower end of a shaft 70 which extends upwardly through and is rotatably supported on the bearing 66. Also fixed to the yoke 68 is a V-shaped crop or stalk deflector 71 having a pair of rearwardly extending divergent arms which straddle the yoke, as shown. The upper end of the shaft 70 projects a distance above the transverse frame members 76 on the front end of the longitudinal frame portion 60, just rearwardly of the frame members 64. Keyed or otherwise fixed to the steering wheel support shaft 70, just above the frame member 64, is a collar 78 having a radial torque arm 80. The steering means 52 for the front steering wheel 26 comprise a double acting hydraulic actuator 82 which is pivotally connected between the outer end of the torque arm 80 and the longitudinal frame portion 60 in such a way that the steering wheel 26 is turned in one direction in response to pressurizing of one end of the actuator cylinder and in the opposite direction in response to pressurizing of the opposite end of the cylinder. The steering actuator 82 is controlled by a valve 84 situated at the operator's station 54. It is now evident, therefore, that the front steering wheel 26 of the harvesting machine may be controlled from the operator's station 54 to steer the machine as it travels along the rows of celery to be harvested.

In order to aid the operator situated at the station 54 in steering the harvesting machine, the latter is provided with a steering guide including a shoe 86 which rides, just ahead of the steering wheel 26, in the furrow containing the steering wheel. Shoe 86 is pivotally supported by arms 88 on the steering wheel support yoke 68 and mounts an upstanding guide 90 which is visible from the operating or steering station 54.

For reasons which appear presently, it is desirably to cut or top the celery stalks to a generally uniform height before harvesting of the stalks by the machine. To this end, the harvesting machine is equipped with a pair of leading topping cutters 92 located in advance of the front steering wheel 26. These topping cutters are mounted on arms 94 which are attached at their rear ends, to the front end of the longitudinal frame portion 60. Each cutter includes a horizontal blade 96 which is driven on a vertical axis of rotation by a hydraulic motor 98, the two hydraulic motors being controlled by a two-position valve 99 at station 56. As may be observed in FIGS. 1 and 10, the topping cutters 92 are spaced laterally of the harvesting machine in such a way that the rotation axes of the cutter blades 96 are located approximately in vertical planes containing the longitudinal center lines of the two seed beds B straddled by the rear harvesting vehicle wheels 28. It will further be observed that the blades are longitudinally dimensioned to cut or top celery which is grown either in single or double rows.

Crop Severing Means 34

(FIGURES 1—3, 5, and 6)

The crop severing means 34 of the illustrated celery harvesting machine 20 comprises a number, shown to be four, of crop severing units 100a and 100b. These crop severing units are essentially identical and differ only in that they are mirror images of one another. Accordingly, the various parts of the several units are designated by the same reference numerals. Each crop severing unit 100a and 100b comprises an upright supporting bar 102 which seats against the rear side of and is adjustably secured by brackets 104 to the forward transverse frame member 76 of the longitudinal frame portion 60. Pivotally attached at their forward ends to and extending rearwardly from each supporting bar 102 are a pair of upper and lower hinge arms 105 which swing in vertical planes. The hinge arms 105 of each severing unit parallel one another and are pivotally attached at the rear ends to an upright blade mounting bar 106 which parallels the forward upright supporting bar 102 of the respective severing unit. It is evident at this point that the supporting bar 102, hinge arms 105, and blade mounting bar 106 of each severing unit together constitute a parallel linkage mechanism which supports the blade mounting bar for vertical movement in such a way that the bar remains vertically oriented. Mounted on the lower end of the blade mounting bar 106 of each crop severing unit 100a, 100b is a crop severing blade 108 rigidly mounting, at one end, an upstanding plate 110. Each blade plate 110 is rigidly joined to a shaft 112 which extends perpendicularly from the side of the plate opposite its respective blade 108. Each blade shaft 112 extends slidably through a bore in the lower end of the corresponding blade support bar 106 and is adjustably secured to the bar by a lock bolt 114. It is significant to note here that the axis of the blade shaft receiving bore in each blade supporting bar 106 extends at an acute angle relative to the vertical plane of the hinge arms 105 to which the bar is attached. Each blade 108 has a leading cutting or shearing edge 116.

The blade mounting bar 106 of each crop severing unit 100a, 100b extends a distance above its respective upper hinge arm 105. Pivotally connected between the upper end of each blade mounting bar and the upper end of the forward supporting bar 102 of the respective unit is a hydraulic blade positioning actuator 118. It will be observed that each blade positioning actuator 118 may be selectively pressurized to vertically adjust the corresponding crop severing blade 108.

For reasons which will appear presently, the crop severing units 100a, 100b are controlled in pairs to adjust the height of their blades 108. To this end, the two hydraulic actuators 118 of the pair of severing unit 100a, 100b at one side of the harvesting machine and the two actuators of the remaining two units are controlled by valves 120 at the operator's station 54 and 56 of the machine. Suffice it to say at this point that when the severing units are installed on the harvesting machine, their blades 108 are disposed in horizontal planes with the blade edges 116 extending across the celery rows 30, respectively, at acute angles relative to the direction of travel of the harvesting machine along the rows. The blades are vertically adjusted to locate the same approximately at ground level, whereby the blades are effective to sever at this level, with a shearing action, the exposed celery stalks at the latter enter the harvesting station 36 of the harvesting machine.

In addition to the structure discussed to this point, each crop severing unit 100a, 100b also preferably includes a cutting or so-called colter blade 122 for clearing weeds and other unwanted material from the path of the machine. These blades are rotatably mounted on the lower hinge arms 105 of the severing units for turning on horizontal axes extending transversely of the machine. The blades 122 are thus situated in advance of the harvesting station 36 of the machine. Further, each severing unit has a crop or stalk deflector 124 in the form of a bent plate which extends forwardly from the lower end of the respective supporting bar 102 and then rearwardly along the inner side of the unit in rearwardly divergent relation thereto, as shown.

Crop Gathering Means 44

(FIGURES 1—10)

An important aspect of the invention is the unique construction and arrangement of the crop gathering means 44 embodied in the present harvesting machine. These crop gathering means comprise a number, shown as four in FIG. 1 and two in FIG. 10, of substantially identical crop gathering or gripping units or wheels 126. Each gathering or gripping wheel has a central hub 128 including a sleeve 130, the ends of which are internally counterbored to receive ball bearing units 132. Each gathering wheel 126 is made in two sections and each of the two sections includes a corresponding short axial tube 134 of rectangular cross section. These two short rectangular tubes 134 are positioned end to end as shown in FIG. 4 and, as shown in FIG. 7, the confronting ends of the two rectangular tubes 134 are interconnected by a pair of bridging straps 133 and pairs of cap screws 133a which extend through the straps into the rectangular tubes. The outer ends of the two confronting rectangular tubes 134 project a distance beyond the outer ends of the sleeve 130 and mount peripherally flanged end discs 136. These end discs are welded or otherwise rigidly secured to the tube 134, just outboard of the ends of the sleeve 130, in such a way that the disc flanges 138 project axially toward one another. Coaxially surrounding the hub 128 are annular resilient rim members 140, hereinafter referred to simply as rims, which are constructed of a relatively compliant or spongy material, such as foam rubber. As shown best in FIGS. 4 and 5, the rims 140 are rectangular in cross section and have generally flat annular confronting gripping faces which are disposed to abut one another when the rims occupy the positions illustrated in the upper portion of FIG. 5. Extending between the hub 128 and the rims 140 are a number of generally uniformly angularly spaced, resilient spokes 142. These spokes are secured at their inner ends to the hub and at their outer ends to the rims. The outer rim ends of the spokes are resiliently yieldable in the axial direction of the wheel to accommodate relative movement of the rims 140 between their separated or open positions illustrated in FIG. 4 and their closed positions illustrated in the upper portion of FIG. 5. The spokes are stressed to yieldably urge the rims toward and retain the rims in their closed positions.

Spokes 142 may be constructed in various ways. In the drawings, each spoke 142 comprises four leaf springs 142a, 142b, 142c, and 142d of progressively increasing length. The inner ends of the spring leafs are flush with one another, whereby the outer ends of the spring leafs are located at progressively greater distances from the axis of the hub 128. The inner ends of the several spring leafs of each spoke 142 extend through a radial slot in the rim flange 138 of the adjacent hub end disc 136 and are secured to the latter by a fastener 144. The outer end of the long leaf 142d of each spoke is bent to normally assume the generally radial disposition illustrated in the upper portion of FIG. 5 and is secured to the outer surface of the adjacent gripping rim 140 by rivets 146. It is obvious at this point that the spokes 142 have maximum stiffness at their inner ends and minimum stiffness at their outer ends, whereby the spokes accommodate resilient yielding movement of the rims 140 between their open and closed positions.

For reasons which will appear presently, it is desirable to resiliently reinforce the rims 140 in the regions between the adjacent spokes 142. To this end, each illustrated crop gathering or gripping wheel 126 is equipped with a number of circumferentially extending coil springs 148 which extend along the outer surfaces of the rims between and are terminally secured to the adjacent spokes. These springs serve to exert axial resilient inward pressure against the rims and thereby yieldably resist axial outward deflection of the rims in the regions between the spokes.

Operation of the present harvesting machine requires the rims 140 of each crop gathering of gripping wheel 126 to be spread to their open positions of FIG. 4 as these rims approach the harvesting station 36 and a following transfer station 150 of the machine and to be released for return to their closed positions of FIG. 5 as the rims emerge from each of these stations. To this end, each crop gathering wheel is equipped with rim spreading means 152 for spreading and releasing the rims of the respective wheel, in the manner just explained. The illustrated rim spreading means 152 of each wheel 126 comprise upper and lower sets 154, 156 of rim spreading rollers 158. The rollers of each roller set 154, 156 are rotatably mounted on the outboard ends of a bracket arm 160 which extends parallel to the rotation axis of the wheel and is rigidly joined, midway between its ends, to a sleeve 162 extending normal to and radially in from the arm. As may be best observed in FIGS. 3 and 4, the hub arms 164, and hence the roller sets 154, 156 of each crop gathering wheel 126 are nearly diametrically opposite one another, being 170° apart.

Each bracket sleeve 162 is rotatably telescoped over the outer end of a corresponding arm 164 extending radially out from the wheel hub 128. Each bracket sleeve 162 is releasably secured to its respective hub arm 164 by a cross pin 169 which may be removed to permit rotation of the corresponding roller set 154, 156, as the case may be, between its positions of FIGS. 4 and 9. Each of the hub arms 164 has a diametrical bore 165 in the plane of rotation and near the outer end of the hub arm. In addition, each hub arm 164 has a second diametrical bore 166 that is perpendicular to the bore 165 and is spaced radially inwardly of the wheel 126 from the bore 165. Each of the bracket sleeves 162 is provided with a single diametrical bore 168. The two bores 165 and 166 of the hub arm and the single diametrical bore 168 of the bracket sleeve 162 cooperate with a removable pin 169 to permit the corresponding roller set 154 or 156 to be placed in either an operative position or an inoperative position.

At the operative position of the roller set 154 or 156 the corresponding bracket sleeve 162 is in the position shown in FIG. 4 with the pin 169 extending through the diametrical bore 168 of the bracket sleeve 162 ad through the bore 165 of the hub arm 164. At the alternate inoperative position of a roller set 154 or 156 shown in FIG. 9, the corresponding roller set 154 or 156 is turned into the plane or rotation and the corresponding bracket sleeve 162 is retracted radially of the wheel 126 with the pin 169 extending through the bore 168 of the bracket sleeve and the bore 166 of the hub arm. At this time, as may be seen in FIG. 9, the roller set 154 or 156 is inside the wheel structure and is spaced from the pair of rims 140 and from the spokes 142.

The roller sets 154, 156 of each crop gathering or gripping wheel 126 are located adjacent the radial inner edges of the gripping rims 140 on the wheel. Secured to the rims, axially inward of the spokes 142, are circular tracks 170 which engage the adjacent rollers 158. These tracks are shown to comprise annular hard rubber rings having radially inner annular beads of generally circular cross section which complement and engage within peripheral grooves in the rollers.

The several stalk gripping wheels 126 are coaxially supported on an axle 172 which extends slidably through and has a rectangular cross section complementing the inner rectangular cross section of the central wheel tubes 134. Axle 172 is generally horizontal and extends crosswise of the harvester frame 24 directly above the crop severing blades 108. The outboard ends of the axle 172 are rotatably supported in vertically adjustable bearing carriages 174 (FIG. 2) in such a way that the axle may be removed axially from the harvesting machine to permit the wheels 126 to be removed from and installed on the axle.

As heretofore noted, the structure of each gathering wheel 126 includes a pair of rigidly interconnected rectangular tubes 134 which embrace the axle 172 of square cross section. Thus, each wheel is effectively keyed to the axle 172 and at the same time may be adjusted longitudinally of the axle. Each gathering wheel 126 is confined at a desired position along the axle 172 by spacer sleeves 173 on opposite sides of the gathering wheel.

It is apparent that one set of spacer sleeves 173 may be substituted for another set for the purpose of changing the position of a gathering wheel along the axle. Preferably, the spacer sleeves 173 which are of rectangular cross section are longitudinally split sleeves, the halves of which are releasably interconnected by suitable bolts (not shown). Such an arrangement of split spacer sleeves makes it a simple matter to substitute one set of spacer sleeves for another.

It is desirable to make the previously mentioned cap screws 133a accessible through the surrounding larger hub sleeve 130 of the gathering wheel structure. For this purpose the hub sleeve 130 of each gathering wheel is provided with radial openings 186 in alignment with the cap screws 133a, respectively. These access openings 186 in each gripping wheel are normally covered by split clamp brackets 188 which normally rigidly secure the rim spreading roller support arms 164 to the wheel hub 128.

As will appear from the ensuing description, proper operation of the crop gathering means 44 requires the stalk gripping wheels 126 to be driven in rotation in such a way that the gripping rims 140 of the wheels travel through the harvesting station 36 of the machine in a direction opposite to the direction of travel of the harvesting machine and at a peripheral speed approximating the forward speed of the machine. To this end, the harvesting machine is equipped with drive means 190 for driving the wheels in rotation in this fashion. The illustrated drive means 190 comprise a sprocket chain 192 which is trained about a sprocket 194 keyed on the wheel axle 172 and an idler sprocket 196 rotatably supported on the harvester frame 24 between the gripping wheels and the rear harvester ground wheels 28. Keyed to and rotatable with the sprocket 196 is a sprocket 198 around which and a sprocket 200 on a shaft 202 is trained a sprocket chain 204. Shaft 202 is rotatably supported on and extends transversely of the harvester frame 24, a distance forwardly of the rear wheels 28. Keyed on the end of the shaft 202, remote from the sprocket 200, is a sprocket 206. A sprocket chain 208 is trained about the sprocket 206 and a sprocket 210 fixed on the rear drive axle for the rear harvester wheels 28. The shaft 202 is provided with a spring loaded manually operable one-way ratchet clutch shown at 211 in FIG. 1 which automatically disengages if the machine is reversed or backed in the field. This clutch may be disengaged to idle the gathering wheels 126 whenever desired. It is now evident, therefore, that the several stalk gripping wheels 126 of the harvesting machine are driven in rotation in unison from the rear drive axle 212. The gripping wheel drive means 190, which may be more accurately described as a power transmission, will be observed to be arranged in such a way that the gripping rims 140 of the gripping wheels 126 rotate through the harvesting station 36 of the harvesting machine in a direction opposite to the direction of forward travel of the machine. Obviously, since the wheels are driven from the rear drive axle 212 of the harvester vehicle 22, the rotary speed of the gripping wheels, and hence the peripheral speed of the gripping wheel rims 140 through the harvesting station 36, are constantly proportional to the forward speed of the vehicle. The several sprockets of the gripping wheel drive means or power transmission 190 are so dimensioned that this peripheral speed of the gripping wheel rims through the harvesting station closely approximates the forward speed of the harvesting vehicle. It is now evident, therefore, that the gripping rims 140 of the stalk gripping wheels 126 are effectively stationary relative to the ground as they travel through the harvesting station 36 of the machine.

As noted earlier, the resilient gripping rims 140 of the stalk gripping wheels 126 are spread and then released by the rim spreading means 152 as the rims approach and then emerge from the harvesting station 36 and thereafter as the rims approach and emerge from the transfer station 150. To this end, the rim spreading means for each wheel include, in addition to the structure already explained, a bar 213a which is removably fitted at one end within and extends radially out from one bracket sleeve 162 of the spreading means. The outer end of this bar is selectively insertable through a number of socket sleeves 213b fixed to a transverse frame member 213c on the harvester frame 24. The rim spreading means are thus releasably secured against rotation with the corresponding gripping wheel 126, and the rollers 158 on the spreading means are effective to spread and release the wheel rims 140 as the latter rotate past rollers. According to the present invention, the rim spreading means 152 are secured in a fixed position wherein the axes of their several rim spreading rollers 158 are located in a common plane containing the common gripping wheel axis which slopes downwardly in the forward direction of the harvesting machine at an angle of about 45° relative to the horizontal, as shown. The rollers of the lower roller sets 156 are thereby located to spread the gripping wheel rims 140 as the latter approach the harvesting station 36 and in such a way that the rims tend to return to their closed positions of contact with one another as they rotate through the lowermost positions on the gripping wheels. The rollers of the upper roller sets 154 are located to respread the wheel rims 140 as the latter approach the transfer station 150, and to release the rims for return to their closed positions as the rims emerge from the latter station.

During operation of the harvesting machine as it is thus far described, the harvesting vehicle 22 and the transport vehicle 40 are driven along the celery rows 30 to be harvested. The stalk gripping wheels 126 are thereby driven in rotation in such a way that the wheel rims 140 travel through the harvesting station 36 of the machine in a rearward direction and at a peripheral speed approximating the forward speed of the harvesting machine. The motors 98 for the topping cutters 96 are energized to drive the topping cutters 96 in rotation. These cutters are then effective to cut or top the celery stalks 32 to a uniform height as they effectively approach the harvesting station 36 of the machine. As will appear presently, the gripping wheels 126 are axially positioned along their supporting axle 172 in such a way that wheels are aligned with the celery rows 30, respectively, to be harvested. The severing units 34 are positioned to have their blades 108 approximately at ground level and extending across the celery rows.

During movement of the harvesting machine along the celery rows, the topped celery stalks 32 in the rows effectively enter the harvesting station 36 of the machine in successive fashion. Thereafter, the stalk enters the gap 126a which exists between the rims 140 of the adjacent gripping wheel 126 at the harvesting station and is simultaneously severed at ground level by the corresponding crop severing blade. The forward travel of the harvesting machine then causes the converging portions of the gripping wheel rims at the trailing end of the rim gap 126a to immediately grip therebetween the severed stalk. The stalk is now transported rearwardly and upwardly by the corresponding gripping wheel 126 to the transfer station 150. Respreading of the gripping wheel rims 140 at this transfer station releases the stalk from its gripping wheel, whereupon the stalk drops by gravity onto the receiving end of the transfer conveyor 46, as explained later. The above topping, severing, and gathering or gripping action, of course, is typical of each celery row 30. As explained below, the crop deflectors 71, 124 guide the celery stalks 32 into their respective gripping wheel rim gaps 126a.

Transfer Conveyor 46

(FIGURES 1—3, 11, 13)

It will be recalled that a further aspect of the invention is concerned with the unique construction and arrangement of the transfer conveyor 46 which transports the severed or harvested celery stalks from the stalk gathering or gripping means 44 to the loading conveyor 48. This transfer conveyor has an elongate frame 214 which extends in a fore-and-aft direction of the harvester frame 24 and inclines upwardly in the direction of its rear end. Rotatably supported on the lower front end and upper rear end of the conveyor frame 214, and extending transversely of this frame, are shafts 216 and 218 mounting sprockets 220 at the outboard ends. Trained about the sprockets are a pair of sprocket chains 222. Conveyor frame 214 is pivotally supported at 224 on the rear upstanding frame structure 62 for vertical swinging movement of the lower front end of the transfer conveyor to adjust the clearance between the latter conveyor and the gripping wheels 126. The transfer conveyor 46 is adjusted by hydraulic adjusting means 226 including a hydraulic actuator 228 having a cylinder pivotally attached to the harvester frame 24. The actuator plunger is pivotally attached to one arm 230 of a bell crank 232 pivoted on the frame 24. This bell crank has a remaining pair of arms located adjacent opposite sides of the conveyor frame 214 and pivotally attached by links 236 to the latter frame. It is now evident, therefore, that the actuator 228 may be pressurized to selectively raise and lower the front end of the transfer conveyor 46. This actuator is controlled by a valve 238 at the operator's station 56.

Extending between and secured to the conveyor chains 222 of the transfer conveyor 46 are a number of parallel, uniformly spaced flight bars 240. A web 242 of thin, flexible material, such as canvas, is trained about the outside of the flight bars 240. A web 242 of thin, flexible material, such as canvas, is trained about the outside of the flight bars 240. This web is wrapped around and stitched together inwardly of each flight bar, as shown, to join the web to the flight bars. The length of the web is substantially greater than the length of the conveyor chains 222 and is joined to the flight bars in such a way that the length of the web section 242a between each pair of adjacent flight bars is substantially greater than the spacing between the bars on the upper and lower linear runs of the conveyor chains 222. As a consequence, the web sections 242a are relatively slack, whereby those web sections travelling along the upper runs of the conveyor chains are conditioned to form pockets for containing the severed celery stalks 32, as may be best observed in FIGS. 3 and 13. Extending along and rising above opposite sides of the conveyor frame 214 are walls 244. The lower ends of these walls terminate closely adjacent the stalk gripping wheels 126 and have their lower marginal portions bent inwardly slightly, as shown best in FIG. 1. The upper ends of the walls terminate above the upper conveyor sprockets 220, as shown best in FIG. 2.

Mounted at the upper end of the transfer conveyor is a hydraulic motor 246 for driving the transfer conveyor chains 222 in the direction indicated by the arrows in FIGS. 3 and 13. This motor is controlled by a valve 247 located at the operator's station 56.

At this point, it is significant to recall that the blades 108 of the severing means 34 are adjusted to sever the celery stalks 32 approximately at ground level, and that the rim spreading rollers 154, 156 of the stalk gripping wheels 126 are effective to spread and then release the resilient gripping rims 140 of the wheels as these rims approach and then emerge from the harvesting station 36 and the following transfer station 150 in such a way that the severed celery stalks are gripped by the wheels at the harvesting station, transported rearwardly from the harvesting station to the transfer station, and then released at this latter station, as shown in FIG. 3. The lower end of the transfer conveyor 46 is located directly below the transfer station 150 in such manner that the celery stalks which are released by the gripping wheels 126 at the latter station drop into the pockets on the lower end of the transfer conveyor, defined by the slack transfer conveyor web sections 242a. The stalks are then transported upwardly by the transfer conveyor and, upon reaching the upper end of the conveyor, are discharged onto the underlying loading conveyor 48, in the manner illustrated in FIG. 13. the lower end of the transfer conveyor is vertically adjusted, by the hydraulic conveyor adjustment means 226, so that the upper run of the conveyor just clears the lower ends of the severed celery stalks advancing toward the transfer station 150 on the gripping wheels 126.

Loading Conveyor 48

(FIGURES 1, 2, 11—13)

The loading conveyor 48 of the illustrated harvesting machine 20 comprises a horizontal frame 248 which extends transversely of the machine in an elevated position between the rear operator's station 58 and the rear upper end of the transfer conveyor 46. Conveyor frame 248 includes a pair of longitudinal side frame members or channels 250 rigidly joined to one another by cross frame members 252. The side channels 250 have outwardly directed upper and lower flanges 254. Rotatably supported on brackets 256 rigidly attached to the rear, upstanding conveyor frame structure 62 at opposite sides of the loading conveyor frame 248, are rollers 258 which project between the flanges 254 on the adjacent conveyor frame side channels 250. These rollers support the conveyor frame 248 for horizontal endwise extension and retraction relative to and laterally of the harvesting machine, as indicated by the broken lines in FIG. 11. Hydraulic operating means 260 are provided for selectively extending and retracting the conveyor frame.

Operating means 260 comprise a pair of hydraulic actuators 262 each including a cylinder 264 and a plunger 266 movable in the cylinder. As shown best in FIGS. 2 and 11, the actuators 262 are located below the loading conveyor frame 248, midway between the side channels 250 of this frame, and are spaced lengthwise of the frame. The lower ends of the actuator cylinders 264 are pivotally attached to the harvester vehicle 24, at opposite sides of the rear operator's station 58. Connected by links 268 to the outer end of the plunger 266 of each actuator are a pair of movable sheaves 270. Associated with each actuator 262 are a pair of fixed sheaves 272. The fixed sheaves 272 are attached, by links 274, to the upstanding frame structure 62, below the center of the loading conveyor frame 248 and between the conveyor roller support brackets 256. Trained about the several pulleys of each set of movable and fixed sheaves 270, 272 is a cable 276. One end of each cable 276 is anchored to the frame structure 62 adjacent the corresponding fixed sheaves 272. The other end of each cable 276 is attached to a depending arm 278 on the underside of the adjacent outboard end of the loading conveyor frame 248. It is evident at this point that the loading conveyor frame 248 may be selectively extended and retracted in its endwise direction relative to the harvester vehicle 22 by selectively pressurizing the conveyor actuators 262 in such a way as to retract the plunger 266 of one actuator into its cylinder 264 and extend the plunger of the other actuator from its cylinder. For example, pressurizing of the actuators in such a way as to retract the plunger of the left hand actuator and extend the plunger of the right hand actuator in FIG. 11 drives the conveyor frame 248 to the right in the figure. Similarly, pressurizing of the actuators in such a way as to retract the plunger of the right hand actuator and extend the plunger of the left hand actuator drives the conveyor frame to the left in the figure. It is further evident that the sheaves 270, 272 and cables 276 which operatively connect the actuators 262 to the conveyor frame 248 constitute, in effect, motion amplifying means which are effective to translate relatively small linear motions of the actuator plungers 266 into substantially greater linear motion of the frame. The conveyor actuators 262 are controlled by a valve 280 located at the operator's station 58.

Extending between and rotatably supported at their ends on the conveyor frame side channels 250, for turning on axes normal to these channels, are a number of rollers 290. An endless conveyor belt 292 is trained about and supported for endwise movement by the rollers 290. The roller 290 at the left hand end of the conveyor frame 248 in FIG. 11 is terminally supported in bearings 294 (only one shown) which are slidably mounted in longitudinal guides 296 on the frame for lateral adjustment of the roller in the endwise direction of the frame. Operatively connected between these bearings and the conveyor frame are screws 298 (only one shown) for adjusting the roller endwise of the frame to regulate the tension in the conveyor belt 292. Mounted on the opposite end of the conveyor frame 248 is a reversible hydraulic motor 300 which is drivably coupled, through a transmission 302, to the adjacent conveyor roller 290 for driving the latter in rotation and thereby driving the conveyor belt 292 in its endwise direction. Motor 300 is controlled by a valve 304 located at the operator's station 58. Valve 304 is selectively positionable to both start and stop the conveyor motor 300, as well as to reverse the direction of the motor and, thereby, the direction of endwise movement of the conveyor belt 292. Welded or otherwise rigidly joined to and substantially coextensive with the side channels 250 of the conveyor frame 248 are side walls 306, 308 which rise above the upper run of the conveyor belt 292. The forward sidewall 308 is somewhat lower than the rear sidewall in order to clear the adjacent end of the transfer conveyor 46.

As may be best observed in FIGS. 1 and 13, the upper rear end of the transfer conveyor 46 is located substantially over the longitudinal center line of the loading conveyor 48. During operation of the harvesting machine 20, the severed celery stalks 32 on the transfer conveyor move upwardly with and around the upper end of this conveyor to a position approximating that occupied by the left hand stalk illustrated in FIG. 13, at which point the stalks are released to drop by gravity from the transfer conveyor onto the underlying conveyor belt 292 of the loading conveyor 48. An important feature of the invention resides in the fact that the spacing between the flight bars 240 of the transfer conveyor diminishes, and the slack in the intervening pocket-forming web sections 242a increases, during movement of the flight bars and web sections about the upper end of the transfer conveyor. This increased slack in the web sections increases the depth of the pockets defined by the web sections. At the same time, since the pockets hang towards the center of the sprocket 220, the pockets slow down. As a result of the momentary deepening and slowing down of the slack conveyor pockets, the stalks are not thrown outwardly by centrifugal force beyond the rear side of the loading conveyor 48. As a consequence, all of the severed stalks drop by gravity from the transfer conveyor onto the underlying loading conveyor. The latter conveyor then transports the stalks toward one end or the other end thereof, depending upon the direction of movement of the conveyor belt 292.

Hydraulic System (FIGURE 14)

The harvester hydraulic system, which is shown in FIG. 14, is generally conventional and thus need not be explained in detail. Suffice it to say that this hydraulic system has a hydraulic fluid reservoir 312 mounted on the harvester vehicle 22, and hydraulic pumping means for pumping hydraulic fluid under pressure from the reservoir to the various control valves of the harvesting machine. The particular hydraulic system illustrated has four separate pumps 314, 316, 318, and 319 for this purpose. Pump 314 supplies hydraulic fluid under pressure to the valve 84 which controls the front steering wheel actuator 82, to the valves 120 which control the severing blade positioning actuators 118, valve 238 which controls the transfer conveyor position actuator 228, and the valve 280 which controls the loading conveyor actuators 262. Pump 316 supplies hydraulic fluid under pressure to the valve 304 which controls the loading conveyor drive motor 300, and pump 318 supplies hydraulic fluid under pressure to the two-position valve 247 which controls the transfer conveyor drive motor 246. Finally, pump 319 supplies hydraulic fluid under pressure to the valve 99 that controls the hydraulic motors 98 of the two topping cutters 92. An accumulator 321 absorbs extreme pressures that would be developed in the event that the topping blades were to strike a tree or something hard enough to suddenly stop the topping blade motors. In FIG. 14, only the high pressure lines leading from the pumps to the valves are illustrated. It will be understood that the actual hydraulic system of the harvesting machine will be equipped with low pressure fluid return lines for returning the fluid from the valves to the hydraulic fluid reservoir 312. Each valve of the hydraulic system has three positions, to wit, a closed position and two open positions. Movement of each valve from one open position to the other reverses the hydraulic fluid connections to its respective hydraulic actuator or motor, as the case may be, to reverse the direction of movement of the actuator or motor.

Operation

As noted earlier, the present harvesting machine may be utilized to harvest celery or other similar crops which are grown in either single or double rows 30 to each seed bed B. In each case, the severing units 100a, 100b and gripping wheels 126 are adjusted laterally of the harvesting vehicle 22 to locate the blades 108 of the severing units in proper stalk severing relation to the celery rows and the gripping wheels in proper stalk gripping relation to the rows. In this regard, attention is directed to FIGS. 1 and 10 which illustrate, respectively, the harvesting machine conditioned to harvest double and single rows of celery. When harvesting double rows of celery, the harvesting machine utilizes four stalk severing units and four stalk gripping wheels. The four gripping wheels 126 are adjusted along their supporting axle 172, in the manner explained earlier, to positions wherein the medial planes of the wheels, i.e., planes normal to the rotation axis of the wheels and passing midway between the respective wheel rims 140, are approximately aligned with the longitudinal center lines of the four celery rows 30, respectively, along the two seed beds straddled by the harvesting machine. The four stalk severing units 100a, 100b, are adjusted to the position of FIG. 1, wherein it will be observed that two of the units are situated between the two inner gripping wheels and the two remaining units are situated outboard of the two outer gripping wheels. The blade 108 of each outer severing unit extends inwardly across and at an acute angle relative to the medial plane of its adjacent gripping wheel. The blade of each inner severing unit extends outwardly across and at an acute angle relative to the medial plane of its adjacent gripping wheel. Each severing unit is vertically adjusted, by means of its respective vertical positioning actuator 118, to locate its blade approximately at ground level. To this end, each severing unit may be equipped with a gage 100c for indicating the height of the corresponding blade relative to the harvester frame 24. The stalk gripping wheels 126 are vertically adjusted, by adjustment of the wheel axle adjustment screws 178, to locate the lowermost portions of the wheel rims 140 a distance above the stalk severing blades 108 which approximates one fifth the height of the exposed celery stalks 32.

It will be recalled that each stalk severing unit 100a, 100b includes a stalk deflector 124. As shown in FIG. 1, the deflectors on the two outer severing units extend rearwardly along the inner sides of these units in rearwardly converging relation to the medial planes of the adjacent outer stalk gripping wheels 126. The deflectors on the two inner severing units extend rearwardly along the outer sides of these units in rearwardly converging relation to the medial planes of the adjacent inner gripping wheels. When harvesting double row celery, two additional stalk deflectors 124a are removably mounted, in any convenient way, on the lower frame cross member 76, midway between the pairs of gripping wheels at opposite sides of the harvesting machine. These additional deflectors have rearwardly divergent arms which extend rearwardly in converging relation to the medial planes of the adjacent gripping wheels, as shown. It will be observed that each deflector 124 and its adjacent deflectors 124a define a rearwardly narrowing throat leading to the intervening gripping wheel.

If, after prolonged use on double row celery the harvesting machine is to be used only temporarily to harvest single row celery, only minimum necessary changes and adjustment need be made for the temporary use. Thus, for harvesting single row celery for only a short time, two of the gathering wheels 126 may be displaced along the axle 172 out of the way and the remaining two gathering wheels may be positioned on the axle for alignment with two corresponding single rows of celery. The two surplus severing units 100a, 100b may also be rearranged.

If, however, prolonged harvesting of single row celery is anticipated, it becomes worthwhile to remove two of the gathering wheels 126 instead of merely shifting the two gathering wheels out of the way, and it may be worthwhile to completely remove two of the four severing units. FIG. 10 shows the position of two gathering wheels 126 when two of the four gathering wheels are removed, and FIG. 10 further shows how the stalk severing units may be arranged if none of the severing units is removed. As so arranged, the blades 108 of each pair of adjacent severing units overlap one another in oblique relation to one another and in oblique relation to the radial plane of the intervening gathering wheel 126.

The cutting edges 116 of the overlapping blades cross one another approximately in the latter plane. The blades, of course, are vertically adjusted to approximately ground level, as before. In this single row harvesting mode under consideration, the stalk deflectors 124a, referred to earlier in connection with double row harvesting, are omitted, and the stalk deflectors 124 of each pair of adjacent severing units 100a, 100b together define a rearwardly narrowing throat leading to the intervening gripping wheel 126, as shown.

After the harvesting machine has been thus adjusted for harvesting, either single or double rows of celery, as the case may be, the machine is conditioned for actual harvesting operation by energizing the stalk topping cutter motors 98 to drive the stalk topping cutters 96 in rotation and operating the hydraulic pumps 314, 316, 318, and 319 and the appropriate hydraulic fluid control valves of the harvester hydraulic system 310 to effect driving of the transfer conveyor 46 and the loading conveyor 48. The loading conveyor shifting actuators 262 are operated to extend the loading conveyor endwise toward the transport vehicle 42 to a position wherein the current discharge end, i.e., discharge end 40 in FIG. 1, of the loading conveyor overlies the transport vehicle. It will be understood that the loading conveyor is driven in a direction such that the upper run of its conveyor belt 292 moves toward the current discharge end.

The harvesting vehicle 22 and transport vehicle 42 are now driven forwardly in unison along the celery rows 30 to be harvested. The stalk gripping wheels 26 are thereby driven in rotation in such a way that the gripping rims 140 of these wheels travel rearwardly through the harvesting station 36 at a peripheral speed approximating the forward speed of the harvesting vehicle. During movement of the harvesting machine along the celery rows, the exposed celery stalks 32 in their respective rows are successively topped to a generally uniform height by the topping cutters 96, and then enter the harvesting station 36 of the machine. As each stalk approaches this station, it enters between the gripping rims 140 of the adjacent stalk gripping wheel 126, which rims are spread at the latter station to receive the stalk, as explained earlier.

Immediately after entering between the spread rims of the adjacent gripping wheel, each celery stalk encounters and is severed at ground level by the adjacent stalk severing blade 108 (FIG. 1) or blades (FIG. 10).

At this point, it is significant to recall that the resilient gripping rims 140 of the stalk gripping wheels 126 are released to spring back or return toward their closed positions of mutual contact as the rims emerge from the harvesting station 36. The lower rim spreading roller sets 156 are so situated that the returning rims of each gripping wheel enter into initial gripping contact with each intervening celery stalk 32 as the latter is severed by the corresponding stalk severing blade, as shown in FIG. 5. This initial gripping contact is established as the rims travel through the lowermost positions on the wheel, where the rims are relatively stationary with respect to the ground. Thus, the gripping wheels do not tend to bend or break the celery stalks as they are severed. The severed celery stalks are then carried rearwardly and upwardly by the gripping wheels toward the transfer station 150, in a manner best illustrated in FIG. 3. Continued spring return of the gripping rims of each gripping wheel toward their closed positions during this rearward and upward travel of the rims causes the latter to firmly grip the intervening severed stalks, thereby to prevent premature release of the stalks from the wheels.

In connection with this stalk gripping action of the gripping wheels 126, it will be recalled that a significant feature of the invention resides in the compliant or spongy composition of the wheel rims 140. These compliant or spongy rims have been found to be uniquely capable of gripping the severed celery stalks without bruising or otherwise damaging the stalks. Moreover, the spongy rims are capable of yielding locally to firmly grip adjacent celery stalks of substantially different size. The springs 148 at the outer surfaces of the rims reinforce the latter in the regions between the gripping wheel spokes 142 in such a way as to enable the rims to firmly grip severed stalks within these regions without adversely effecting the ability of the rims to yield locally into gripping contact with stalks of different size.

Spreading of the gripping wheel rims 140 by the upper spreading roller sets 154 as the rims approach the transfer station 150 released the severed celery stalks 32 from the gripping wheels 126. The stalks then drop by gravity onto the underlying receiving end of the transfer conveyor 46 and into the stalk receiving pockets formed on the upper rim of the latter conveyor by the slack sections 242a of the conveyor web 242. The lower receiving end of the transfer conveyor is vertically adjusted, by the conveyor positioning actuator 228, to just clear the severed ends of the celery stalks approaching the transfer station on the gripping wheels. The severed celery stalks are conveyed upward and rearwardly by the transfer conveyor and eventually drop from the upper end of the latter conveyor onto the underlying loading conveyor 48. In connection with this discharge of the celery stalks from the transfer conveyor to the loading conveyor, it will be recalled that an important feature of the invention resides in the fact that the stalk receiving pockets defined by the slack web sections 242a of the transfer conveyor both increase in depth and momentarily slow down in their travel as they pass around the upper end of the conveyor with the consequence that the stalks when discharged from the transfer conveyor are not duly acted upon by centrifugal force.

After their discharge onto the loading conveyor 48, the severed celery stalks are transported by the latter conveyor to its current discharge end 40. The stalks then drop by gravity from this latter end of the conveyor onto the transport vehicle 42. A feature of the invention in connection with the loading conveyor is that this conveyor may be shifted back and forth in its endwise direction, and the position of the transport vehicle 42 relative to the harvesting vehicle 22 may be adjusted in the fore-and-aft direction of the vehicles, to effect generally uniform distribution or loading of the harvested celery stalks over the entire cargo area of the transport vehicle.

When driving the present harvesting machine from one harvesting location to another, it is desirable to inactivate the rim spreading means 152 of the stalk gripping wheels 126. Inactivation of the rim spreading means is accomplished by removing the arms 213a which secure the rim spreading means to the harvester frame 24 and by both rotating the spreading roller sets 154 and 156 90° from their normal positions and retracting each spreading roller set radially inwardly from a normal operating position shown in FIG. 4 to an inner idle position shown in FIG. 9. This reduces the deformation in the gripping rims 140 and spokes 142 of the gripping wheels and permits the rim spreading roller sets 154, 156 to rotate with the wheels, thereby to minimize the stress in and wear of the wheels.

While specific structural details have been shown and described, it should be understood that changes and alterations may be resorted to without departing from the spirit of the invention as defined in the appended claims.

We claim:

1. In a harvesting apparatus for travelling along a row of celery or the like having upright stalks, wherein means severs the stalks close to ground level and means to gather the stalks is in the form of a wheel having a pair of flexible rims biased to grip and carry the stalks and wherein spreader means spreads the flexible rims apart locally for the purpose of gripping and releasing the stalks, the improvement comprising:

said spreader means being rotatable about the axis of the wheel and being retractable radially into the interior of the structure of the wheel;

means to retain said spreader means in a fixed position in opposition to the rotation of the wheel to make the wheel effective for gathering and releasing stalks; and said retaining means being releasable to free the spreader means for radial retraction when the apparatus travels without harvesting operation.

2. An improvement as set forth in claim 1 in which said spreader means is of elongated overall configuration with a major axis and a minor axis, said spreader means being rotatable between an operating position with its major axis perpendicular to the two flexible rims and an alternate idle position with its minor axis perpendicular to the two rims; and means to releasably retain the spreader means in its two alternate positions.

3. An improvement as set forth in claim 1 in which said wheel has circumferentially spaced radial flexible spokes;

the two rims are annular elastomeric members supported at circumferentially spaced points by the spokes; and coil springs interconnect the spokes on the outer side of the elastomeric members to reinforce the elastomeric members.

4. In a harvesting apparatus for travelling along a row of celery or the like having upright stalks, wherein means severs the stalks close to ground level and means to gather the stalks is in the form of a wheel having a pair of flexible rims biased to grip and carry the stalks and wherein spreader means spreads the flexible rims apart locally for the purpose of gripping and releasing the stalks, the improvement comprising:

said spreader means comprising a pair of rollers for rolling contact with the two flexible rims, respectively;

support means carrying the pair of rollers, said support means being rotatable independently of the wheel about the axis of the wheel;

means to anchor said support means against rotation with the wheel thereby to make the spreader means cooperative with the wheel to cause the flexible rims to grip and release stalks; and said anchoring means being releasable to free the spreader means.

5. Harvesting apparatus as set forth in claim 4 which includes:

means carrying the pair of rollers, said carrying means being rotatably mounted on said support means for rotation thereon between a first position with the two rollers aligned transversely of the pair of flexible rims and a second position with the two rollers aligned with the pair of rims for lesser spreading action on the rims;

means effective between said carrying means and said support means to releasably hold the carrying means in its first position; and said holding means being releasable to permit rotation of the carrying means to its second position on the support means.

6. Harvesting apparatus as set forth in claim 5 in which said carrying means is retractable radially inwardly of the wheel to place the pair of rollers inside the structure of the wheel when the carrying means is in said second position.